United States Patent
Tsai

(10) Patent No.: US 10,637,132 B2
(45) Date of Patent: Apr. 28, 2020

(54) ANTENNA UNIT WITH ANTI-FEED POWER DIVIDER FUNCTION AND ARRAY MODULE THEREOF

(71) Applicant: CUBTEK INC., Hsinchu County (TW)

(72) Inventor: Ching-Han Tsai, Hsinchu County (TW)

(73) Assignee: Cubtek Inc., Hsinchu County (TW)

( * ) Notice: Subject to any disclaimer, the term of this patent is extended or adjusted under 35 U.S.C. 154(b) by 556 days.

(21) Appl. No.: 15/590,592

(22) Filed: May 9, 2017

(65) Prior Publication Data
US 2017/0331180 A1 Nov. 16, 2017

(30) Foreign Application Priority Data

May 10, 2016 (TW) .............................. 105114393 A

(51) Int. Cl.
| | | |
|---|---|---|
| H01Q 1/32 | (2006.01) | |
| H01Q 21/06 | (2006.01) | |
| G01S 13/93 | (2020.01) | |
| H01Q 21/00 | (2006.01) | |
| G01S 13/931 | (2020.01) | |

(52) U.S. Cl.
CPC ......... *H01Q 1/3283* (2013.01); *G01S 13/931* (2013.01); *H01Q 1/3233* (2013.01); *H01Q 21/0025* (2013.01); *H01Q 21/065* (2013.01)

(58) Field of Classification Search
CPC ....... H01Q 1/3233–3291; H01Q 13/08; H01Q 21/065
See application file for complete search history.

(56) References Cited

U.S. PATENT DOCUMENTS

| | | | |
|---|---|---|---|
| 7,518,554 B2 * | 4/2009 | Bateman | H01Q 1/38 343/700 MS |
| 7,705,782 B2 * | 4/2010 | Lee | H01Q 21/065 333/116 |
| 9,541,639 B2 * | 1/2017 | Searcy | G01S 7/03 |
| 2015/0255867 A1 * | 9/2015 | Inoue | H01Q 1/38 343/853 |

* cited by examiner

*Primary Examiner* — Binh B Tran
*Assistant Examiner* — Amal Patel
(74) *Attorney, Agent, or Firm* — Muncy, Geissler, Olds & Lowe, P.C.

(57) ABSTRACT

An antenna unit with anti-feed power divider function includes a first substrate, a second substrate, a microstrip antenna layer, a grounding layer, a microstrip wire layer and two vias. The microstrip antenna layer is disposed on an upper surface of the first substrate and has plural microstrip antennas and a high impedance wire connected to the microstrip antennas. The grounding layer is set on a lower surface of the second substrate. The two vias penetrates the first and the second substrates to electrically connect the microstrip wire layer and the microstrip antennas, wherein the two vias have different sizes. An antenna module thereof is also disclosed. The present invention precisely controls the power ratio and phase difference, utilizable for generating a symmetric and asymmetric feeding antenna array, thereby achieving a hierarchical feeding and minimizing the antenna structure.

10 Claims, 7 Drawing Sheets

ANTENNA UNIT WITH ANTI-FEED POWER DIVIDER FUNCTION AND ARRAY MODULE THEREOF

BACKGROUND OF THE INVENTION

1. Field of the Invention

The present invention relates to antenna modules, and more particularly, to an antenna unit with anti-feed power divider function and the array module thereof for power dividing.

2. Description of the Related Art

A vehicle radar is a device with a wireless signal transceiver disposed on a vehicle bumper or inside a fan guard, so as to detect relative distance and exchange information by transmitting and receiving wireless signals. Due to a limited space applicable in the vehicle bumper and the easy attenuation property of the radar signal, an antenna array properly meeting all aspects of requirements is difficult to be provided.

A conventional vehicle radar usually applies a microstrip type antenna array, with a coupling structure minimizing the square measure thereof. However, the operation bandwidth of the vehicle radar system ranges between 24 GHz to 77 GHz, while an improvement upon the antenna performance for further enhancing the antenna gain in such a high frequency range is difficult to be conducted. Therefore, it is desired for the industry to effectively enhance the antenna array gain, minimize the square measure necessary for the antenna, and optimized the antenna radiation pattern.

SUMMARY OF THE INVENTION

For improving the issues above, an antenna unit with anti-feed power divider function and the array module thereof are disclosed. By varying the size of dual metal vias, the interval distance therebetween, and the relative positions of the vias against the microstrip antenna. The power ratio and phase difference on two sides of the upper layer are precisely controlled. Also, such components are applied for forming the symmetric an asymmetric antenna array, so as to minimize the antenna structure and achieve a hierarchical feeding property.

For achieving the aforementioned objectives, an antenna unit with anti-feed power divider function in accordance with an embodiment of the present invention is provided, comprising:

a first substrate provided with an upper surface and a lower surface;

a second substrate disposed on the lower surface of the first substrate, the second substrate provided with an upper surface and a lower surface;

a microstrip antenna layer disposed on the upper surface of the first substrate, the microstrip antenna layer including a first microstrip antenna, a second microstrip antenna, and a high impedance wire connecting the first microstrip antenna and the second microstrip antenna;

a grounding layer disposed on the upper surface of the second substrate and positioned between the first substrate and the second substrate;

a microstrip wire layer disposed on the lower surface of the second substrate; and a first via and a second via penetrating the first substrate and the second substrate, and electrically connecting the microstrip wire layer and the first microstrip antenna of the microstrip antenna layer, wherein a size of the first via is different from a size of the second via.

An antenna array module of antenna units with anti-feed power divider function in accordance with an embodiment of the present invention is also provided, comprising:

a first substrate provided with an upper surface and a lower surface;

a second substrate disposed on the lower surface of the first substrate, the second substrate provided with an upper surface and a lower surface;

a grounding layer disposed on the upper surface of the second substrate and positioned between the first substrate and the second substrate;

a microstrip wire layer disposed on the lower surface of the second substrate; and plural antenna units disposed on the first substrate in an array arrangement, wherein each antenna unit comprises:

a microstrip antenna layer disposed on the upper surface of the first substrate, the microstrip antenna layer including a first microstrip antenna, a second microstrip antenna, and a high impedance wire connecting the first microstrip antenna and the second microstrip antenna; and a first via and a second via penetrating the first substrate and the second substrate, and electrically connecting the microstrip wire layer and the first microstrip antenna of the microstrip antenna layer, wherein a size of the first via is different from a size of the second via.

DETAILED DESCRIPTION OF THE INVENTION

Figure 1:
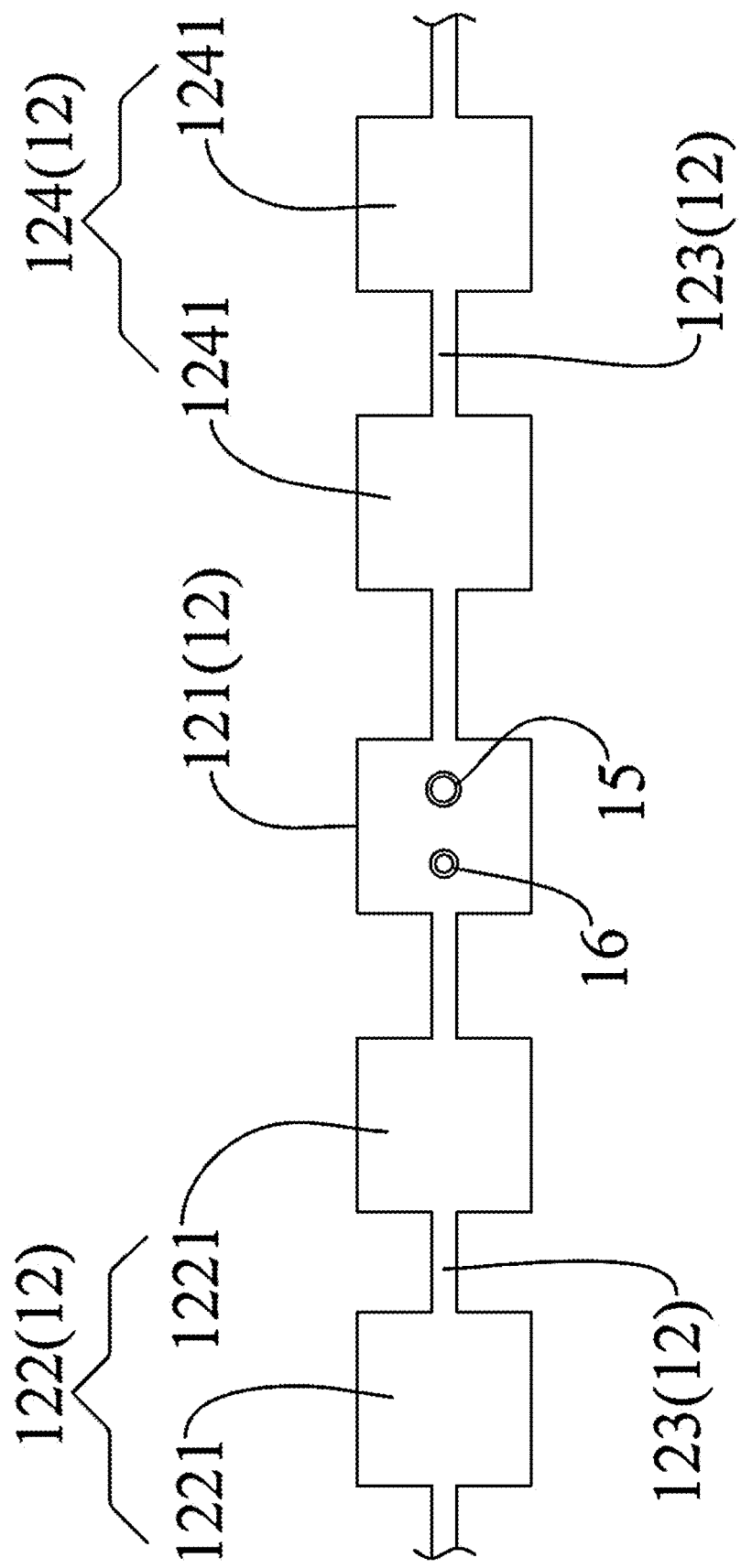
FIG. 1 is a top view of an antenna unit with anti-feed power divider function in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

The present invention provides an antenna unit 1 with anti-feed power divider function and the array module thereof. The antenna unit 1 comprises a first substrate 10, a second substrate 11, a microstrip antenna layer 12, a grounding layer 13, a microstrip wire layer 14, and two metal vias. The sizes of the two vias are different from each other. The two vias penetrate the first substrate 10 and the second substrate 11, respectively, so as to electrically connect the microstrip wire layer 14 and a portion of the microstrip antenna layer 12. By varying the size, interval distance, and relative positions of the two metal vias, the power ratio and phase difference output on two sides of the upper layer structure are precisely controlled.

Figure 2:
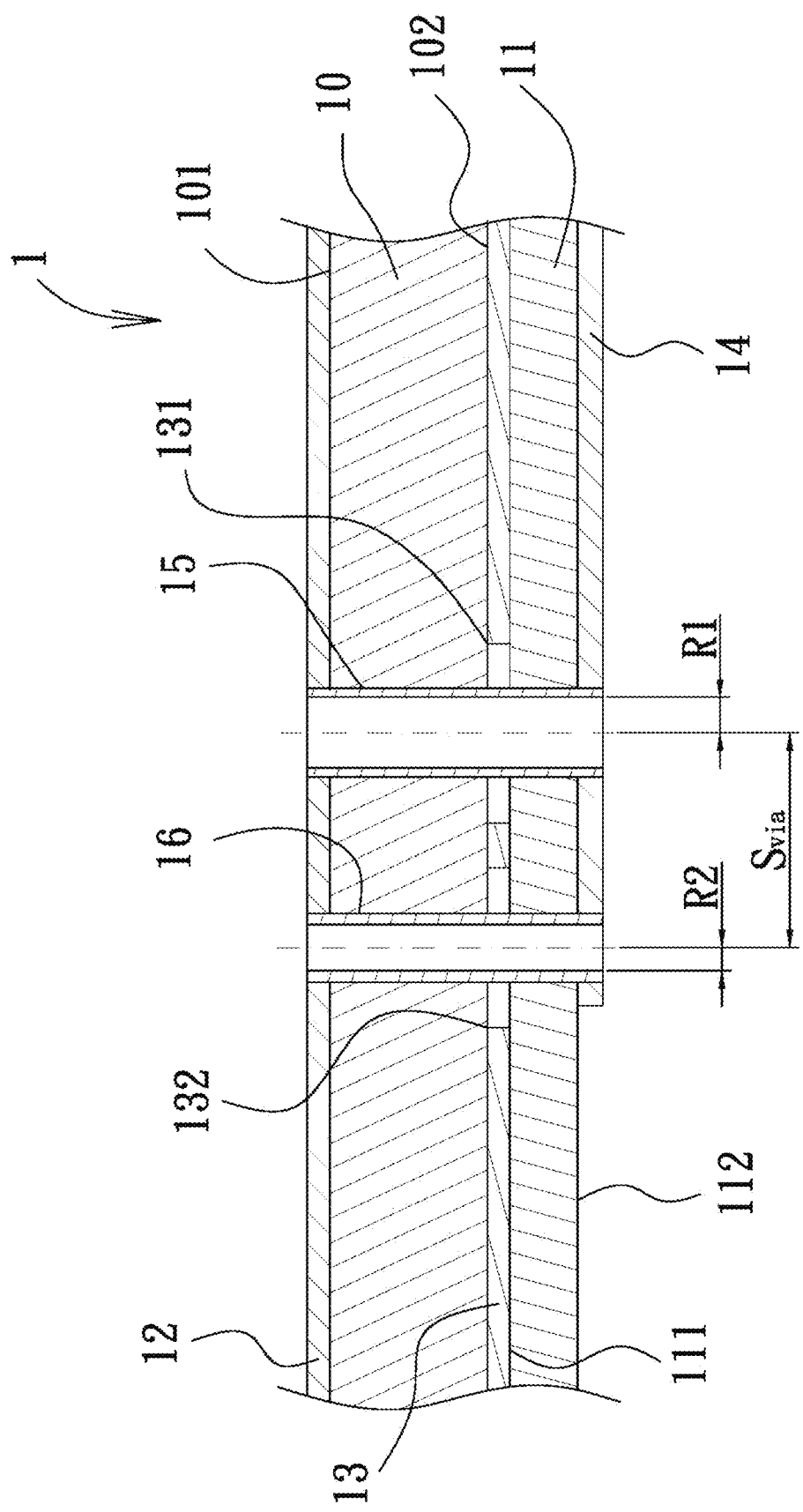
FIG. 2 is a sectional view of the antenna unit with anti-feed power divider function in accordance with an embodiment of the present invention.

FIG. 1 and FIG. 2 illustrate a top view and a sectional view of an embodiment of an antenna unit 1 with anti-feed power divider function. The antenna unit 1 comprises a first substrate 10, a second substrate 11, a microstrip antenna layer 12, a grounding layer 13, a microstrip wire layer 14, a first via 15, and a second via 16. As shown by the figures, the second substrate 11 is disposed on the lower surface 102 of the first substrate 10. The microstrip antenna layer 12 is disposed on the upper surface 101 of the first substrate 10, wherein the microstrip antenna layer 12 includes a first microstrip antenna 121, a second microstrip antenna 122, and a high impedance wire 123 which is connected with the first microstrip antenna 121 and the second microstrip antenna 122. The grounding layer 13 is disposed on the upper surface 111 of the second substrate 11 and positioned between the first substrate 10 and the second substrate 11.

The microstrip wire layer 14 is disposed on the lower surface 112 of the second substrate 11. The first via 15 and the second via 16 penetrate the first substrate 10 and the second substrate 11, respectively, so as to electrically connect the microstrip wire layer 14 and the first microstrip antenna 121 of the microstrip antenna layer 12. The size of the first via 15 is different form the size of the second via 16. In an embodiment of the present invention, the first via 15 is a hollow column, with conductive material disposed on the column wall. Also, the second via 16 is a hollow column, with conductive material disposed on the column wall. The outer radius R1 of the first via 15 ranges from 4 to 8 mils; the outer radius R2 of the second via 16 ranges from 4 to 8 mils.

Accordingly, in an embodiment, the grounding layer 13 is provided with two openings 131, 132 through where the first via 15 and the second via 16 penetrate. Also, central points of the two openings 131, 132 overlap the central points of the first via 15 and the second via 16, respectively. The first via 15 and the second via 16 are applied for feeding the antenna arrays on two sides of the upper layer. When the current enters the microstrip antenna layer 12 through the vias, a portion of the current excites the microstrip antenna layer 12 to resonate, providing direct radiation and feeding in the high impedance wire 123 as well, with another part of the current directly flowing in the high impedance wire 123. Accordingly, due to the resonance mode of the microstrip antenna, when the first part of the current is fed in the two sides, amplitudes of the resonances are identical and performed in reverse phases, maintaining the balance of the resonances. The second part of the current allows the side which is in adjacent to the vias to acquire relatively large energy. If only one via is provided, the summation of the two parts will cause the imbalance between the two sides of the microstrip antenna. Therefore, two asymmetric metal vias are applied by the present invention, such that the power output of the two ports are appropriately adjusted to be present in a certain ratio and in phases reverse to each other. In an embodiment, an interval Svia between the central point of the first via 15 and the central point of the second via 16 ranges from 20 mils to 30 mils, which is adjustable according to different user demands.

Accordingly, in an embodiment, the second microstrip antenna 122 comprises plural first radiation units 1221 disposed on one side of the first microstrip antenna 121 in a strip shape array arrangement, the high impedance wire 123 connecting the first microstrip antenna 121 and the second micro strip antenna 122; also, the high impedance wire 123 connects plural second microstrip antennas 122. In another embodiment, the antenna unit 1 with anti-feed power divider function further includes a third microstrip antenna 124, which is provided with plural second radiation units 1241 disposed on the other side of the first microstrip antenna 121 in a strip array arrangement, the high impedance wire 123 connecting the first microstrip antenna 121 and the third microstrip antenna 124; also, the high impedance wire 123 is connected between plural third microstrip antennas 124.

In the embodiment, the first microstrip antenna 121 in the middle is able to be a microstrip antenna with power divider function, and the antennas (the second microstrip antenna 122, the third microstrip antenna 124) on the two sides thereof are able to be in different subarrays. In other words, the microstrip antenna with power divider function designs the dividing ratio of the power according to the radiation unit amounts of the subarrays on the two sides. Therefore, the amount of the first radiation units 1221 and the amount of the second radiation unit 1241 may be different from each other.

Figure 3:
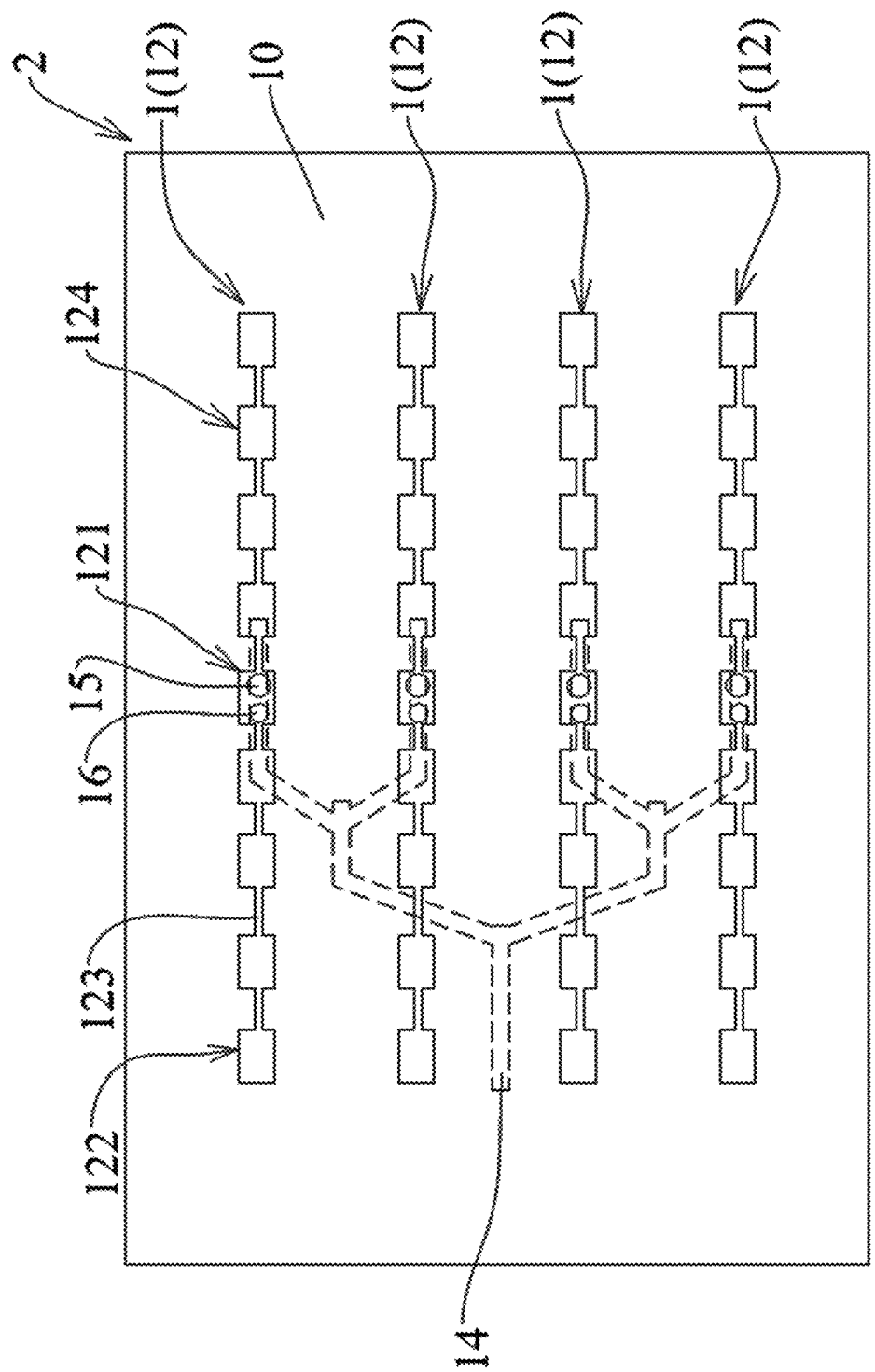
FIG. 3 is a schematic view illustrating an array module of the antenna unit with anti-feed power divider function in accordance with an embodiment of the present invention.

Further, in another embodiment, referring to FIG. 3, a different embodiment of an antenna array module 2 is illustrated. In the embodiment, plural antenna units are disposed on the first substrate 10 in an array arrangement, wherein each antenna unit 1 includes a microstrip antenna layer 12, a first via 15, and a second via 16. The microstrip antenna layer 12 is disposed on the upper surface 101 (as shown by FIG. 2) of the first substrate 10 (as shown by FIG. 1), wherein the microstrip antenna layer 12 includes a first microstrip antenna 121, a second microstrip antenna 122, and a high impedance wire 123 which is connected with the first microstrip antenna 121 and the second microstrip antenna 122.

The first via 15 and the second via 16 penetrate the first substrate 10 and the second substrate 11 (as shown by FIG. 2), respectively, so as to electrically connect the microstrip wire layer 14 and the first microstrip antenna 121. Also, the size of the first via 15 and the size of the second via 16 are different from each other. The microstrip wire layer 14 is electrically connected with plural antenna units 1. In different embodiments, the distance between each antenna units 1 with anti-feed power divider function is variable according to different user demands. Preferably, the interval between the antenna units ranges from 50 mils to 60 mils. Other components and the relative dispositions thereof are similar with the arrangement of the aforementioned embodiments, thus hereby omitted.

Figure 4A:
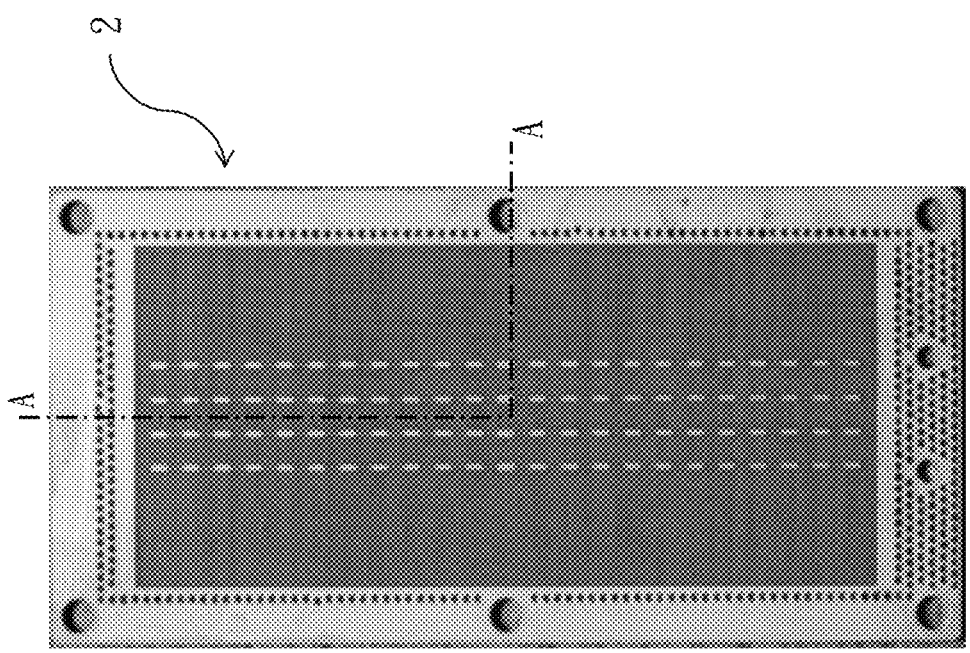
FIG. 4A is a photograph of a long distance high gain and vertically polarized antenna.
Figure 4B:
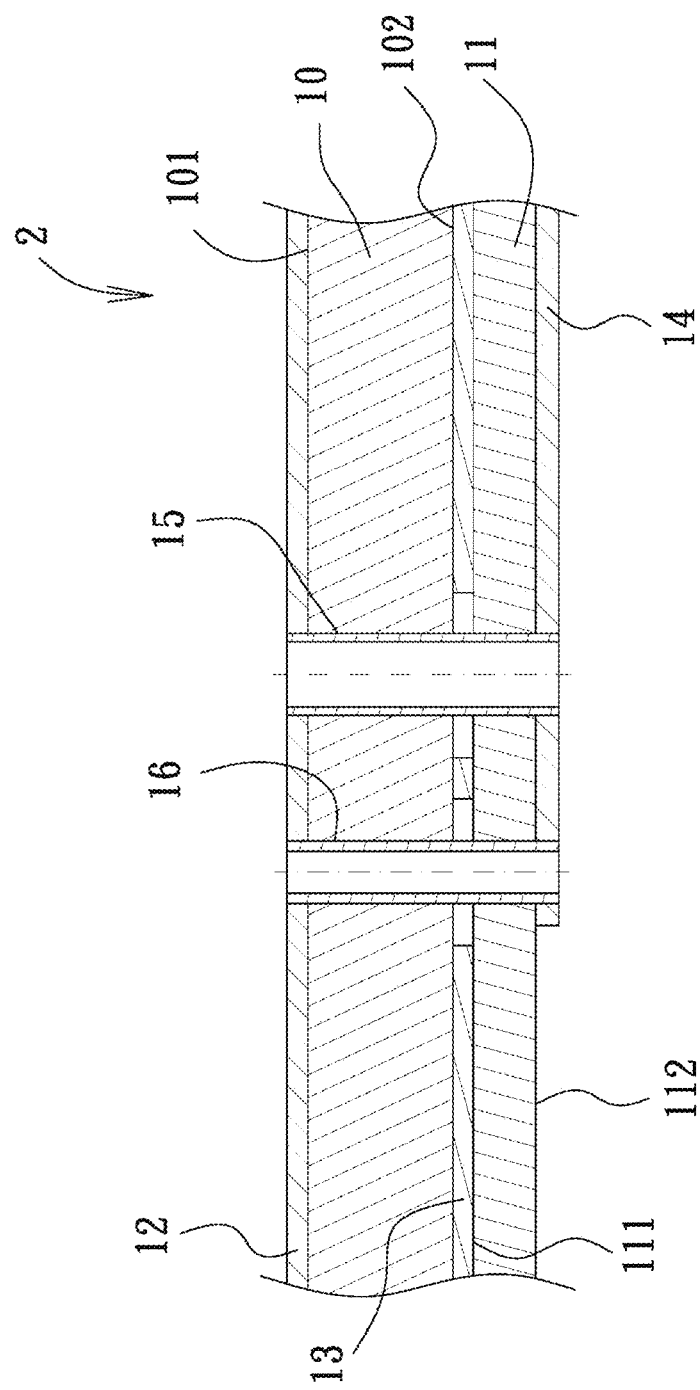
FIG. 4B is a cross-sectional view taken along line A-A in FIG. 4A.
Figure 4C:
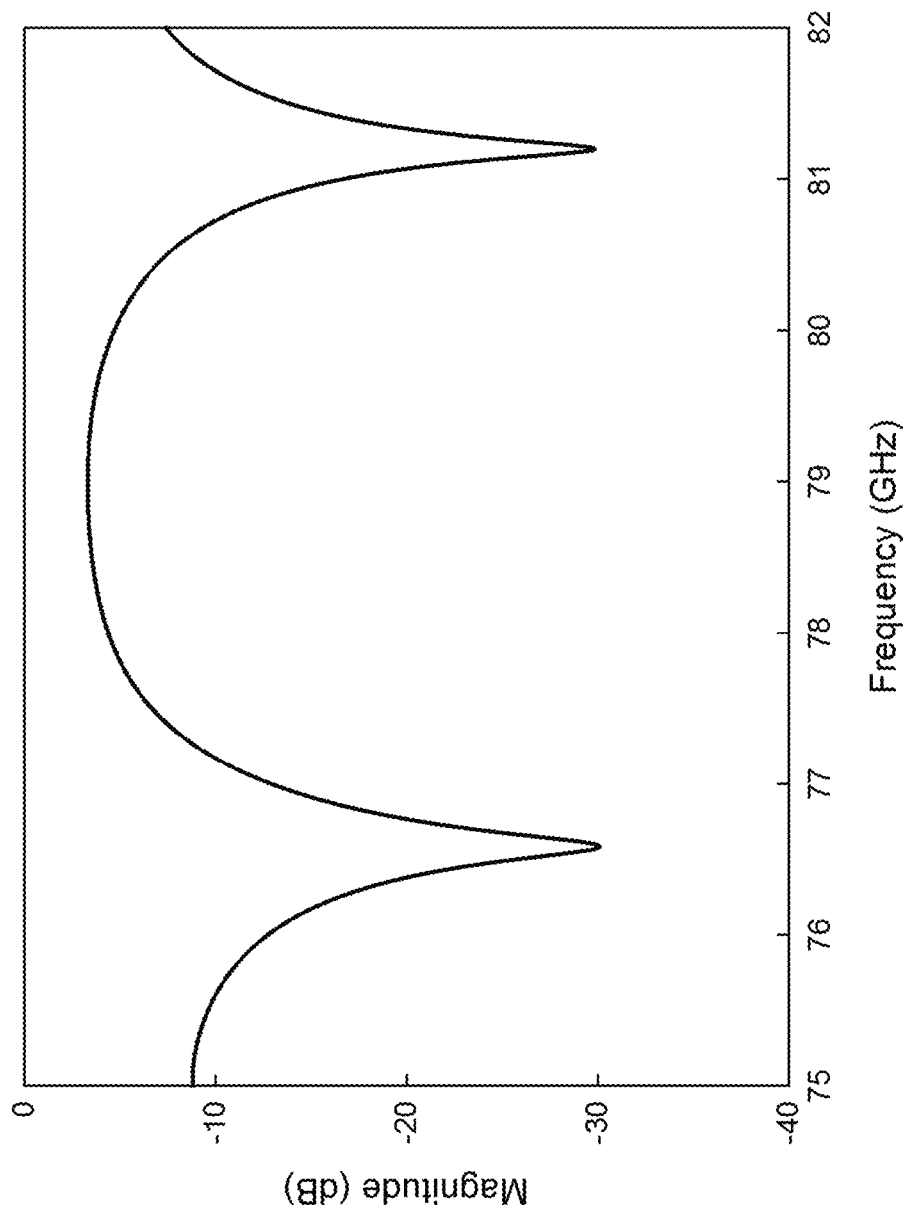
FIG. 4C is a schematic view illustrating the reflection of the antenna in FIG. 4A.
Figure 5:
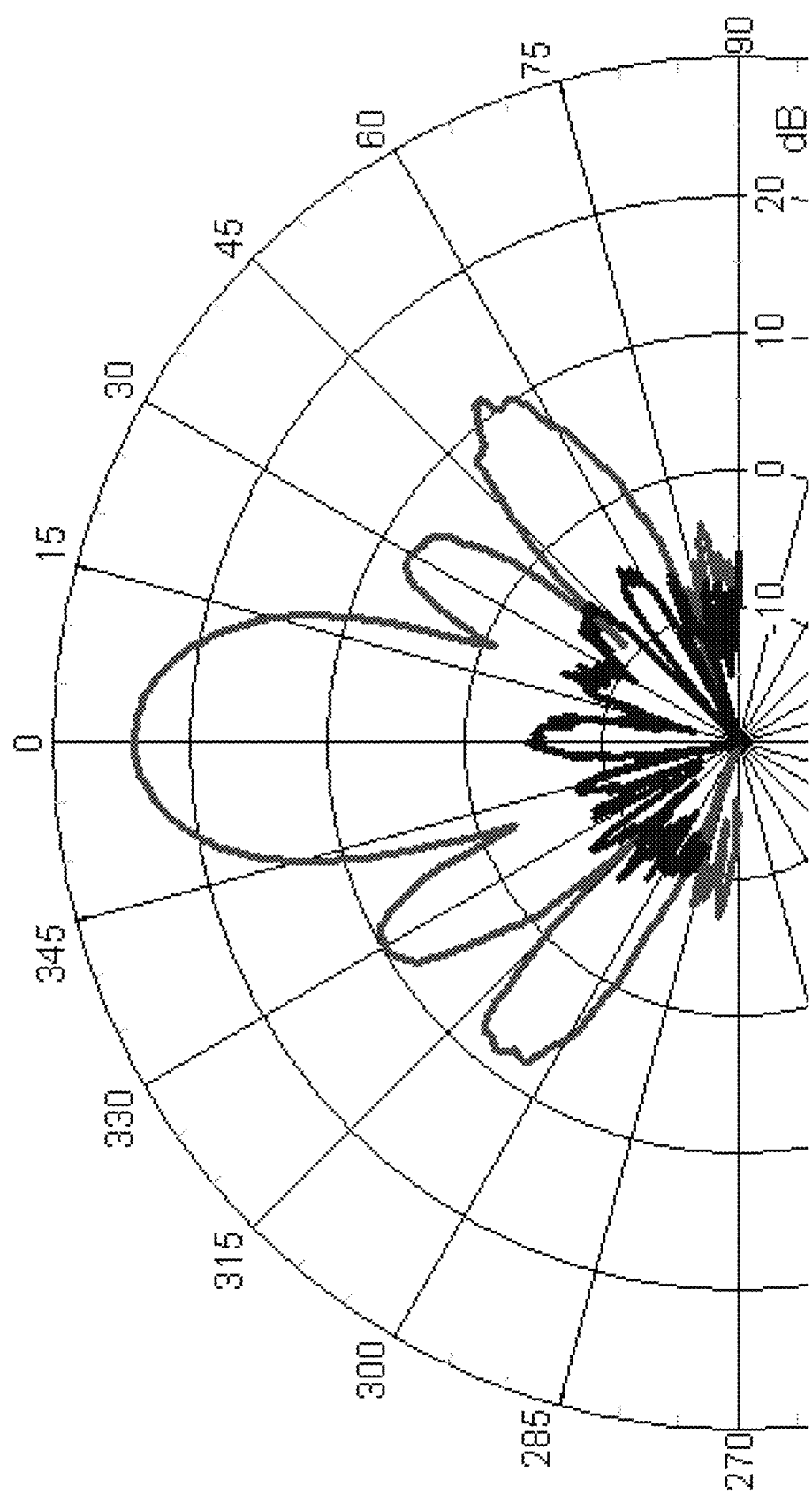
FIG. 5 is an H-plane radiation pattern diagram of the embodiment of FIGS. 4A, 4B, and 4C.

An embodiment of the present invention is further illustrated. FIG. 4A is a photograph of a long distance high gain and vertically polarized antenna. FIG. 4B is a cross-sectional view taken along line A-A in FIG. 4A. FIG. 4C is a schematic view illustrating the reflection of the antenna in FIG. 4A. In the embodiment of FIG. 4A, the thickness of the first substrate 10 is 20 mils. The thickness of the second substrate 11 is 5 mils. The thickness of the microstrip antenna layer 12 is 1.5 mils. The thickness of the grounding layer 13 is 0.7 mils. The thickness of the microstrip wire layer 14 is 1.5 mils. The antenna array module 2 is provided with a 77 GHz anti-feed power divider, with the operation bandwidth thereof ranging from 76 to 77 GHz. In this embodiment, referring to FIG. 5 illustrating the H-plane radiation pattern of embodiments shown in FIG. 4A, FIG. 4B, and FIG. 4C, a 24 dB gain is acquired under the frequency of 76.5 GHz.

To sum up, regarding the antenna unit 1 with anti-feed power divider function and the array module thereof, the antenna is formed of two lays of substrates and three layers of metal, wherein the signal is fed through the microstrip wire of the lower layer, penetrating the hole of the ground, thus entering the microstrip antenna layer 12 of the upper layer from the differently sized two metal vias. Two sides of the microstrip antenna layer 12 are connected with the high impedance wires 123 for feeding the subarrays disposed on two sides of the upper layer, so as to form an array antenna. By varying the open-circuit wire at the distal ends of the microstrip wire layer 14 disposed on the lower layer, the size of the two metal vias, and the interval and relative positions of the two vias against the microstrip antenna, the power ratio and phase difference output on two sides of the upper layer are precisely controlled. Also, such components are applied for forming symmetric and asymmetric feeding antenna array, so as to minimize the antenna structure and achieve a hierarchical feeding property Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An antenna unit with anti-feed power divider function, comprising:
    a first substrate provided with an upper surface and a lower surface;
    a second substrate disposed on the lower surface of the first substrate, the second substrate provided with an upper surface and a lower surface;
    a microstrip antenna layer disposed on the upper surface of the first substrate, the microstrip antenna layer including a first microstrip antenna, a second microstrip antenna, and a high impedance wire connecting the first microstrip antenna and the second microstrip antenna;
    a grounding layer disposed on the upper surface of the second substrate and positioned between the first substrate and the second substrate;
    a microstrip wire layer disposed on the lower surface of the second substrate; and
    a first via and a second via penetrating the first substrate and the second substrate, so as to electrically connect the microstrip wire layer and the first microstrip antenna of the microstrip antenna layer, wherein a size of the first via is different from a size of the second via.

2. The antenna unit of claim 1, wherein the second microstrip antenna includes plural first radiation units disposed on one side of the first microstrip antenna in a strip shape array arrangement; the high impedance wire connects the first microstrip antenna and the second microstrip antenna; the high impedance wire connects plural second microstrip antennas.

3. The antenna unit of claim 2, further comprising a third microstrip antenna which includes plural second radiation units disposed on another side of the first microstrip antenna in a strip shape array arrangement, the high impedance wire connecting the first microstrip and the third microstrip antenna; also, the high impedance wire connects plural third microstrip antennas.

4. The antenna unit of claim 3, wherein the plural first radiation units and the second radiation units are provided in different amounts.

5. The antenna unit of claim 1, wherein the grounding layer is provided with two openings through where the first via and the second via penetrate; central points of the two openings are overlap central points of the first via and the second via, respectively.

6. An antenna array module of antenna units with anti-feed power divider function, comprising:
    a first substrate provided with an upper surface and a lower surface;
    a second substrate disposed on the lower surface of the first substrate, the second substrate provided with an upper surface and a lower surface;
    a grounding layer disposed on the upper surface of the second substrate and positioned between the first substrate and the second substrate;
    a microstrip wire layer disposed on the lower surface of the second substrate; and
    plural antenna units disposed on the first substrate in an array arrangement,
    wherein each antenna unit comprises:
        a microstrip antenna layer disposed on the upper surface of the first substrate, the microstrip antenna layer including a first microstrip antenna, a second microstrip antenna, and a high impedance wire connecting the first microstrip antenna and the second microstrip antenna; and
        a first via and a second via penetrating the first substrate and the second substrate, so as to electrically connect the microstrip wire layer and the first microstrip antenna of the microstrip antenna layer, wherein a size of the first via is different from a size of the second via.

7. The antenna array module of claim 6, wherein the second microstrip antenna includes plural first radiation units disposed on one side of the first microstrip antenna in a strip shape array arrangement, the high impedance wire connecting the first microstrip antenna and the second microstrip antenna; also, the high impedance wire connects plural second microstrip antennas.

8. The antenna array module of claim 7, further comprising a third microstrip antenna which includes plural second radiation units disposed on another side of the first microstrip antenna in a strip shape array arrangement, the high impedance wire connecting the first microstrip and the third microstrip antenna; also, the high impedance wire connects plural third microstrip antennas.

9. The antenna array module of claim 8, wherein the plural first radiation units and the second radiation units are provided in different amounts.

10. The antenna array of claim 6, wherein the microstrip wire layer electrically connects the plural antenna units with anti-feed power divider function.

* * * * *